United States Patent
Wildfang

(10) Patent No.: US 10,288,201 B2
(45) Date of Patent: May 14, 2019

(54) HOSE LINE AND METHOD FOR PRODUCING A HOSE LINE

(71) Applicant: Neoperl GmbH, Mullheim (DE)

(72) Inventor: Fabian Wildfang, Mullheim (DE)

(73) Assignee: Neoperl GmbH, Müllheim (DE)

( * ) Notice: Subject to any disclaimer, the term of this patent is extended or adjusted under 35 U.S.C. 154(b) by 345 days.

(21) Appl. No.: 14/917,602

(22) PCT Filed: Jun. 18, 2014

(86) PCT No.: PCT/EP2014/001657
§ 371 (c)(1),
(2) Date: Mar. 9, 2016

(87) PCT Pub. No.: WO2015/062678
PCT Pub. Date: May 7, 2015

(65) Prior Publication Data
US 2016/0223112 A1 Aug. 4, 2016

(30) Foreign Application Priority Data
Oct. 31, 2013 (DE) .................... 20 2013 009 630 U

(51) Int. Cl.
*F16L 33/207* (2006.01)
*E03C 1/02* (2006.01)

(52) U.S. Cl.
CPC ............ *F16L 33/207* (2013.01); *E03C 1/025* (2013.01); *F16L 33/2076* (2013.01)

(58) Field of Classification Search
CPC .............................. F16L 33/207; F16L 33/2076
USPC ..................................................... 285/256, 39
See application file for complete search history.

(56) References Cited

U.S. PATENT DOCUMENTS

| 1,954,989 | A | | 4/1934 | Eastman | |
|---|---|---|---|---|---|
| 2,177,095 | A | * | 10/1939 | Cowles | ................. F16L 33/207 285/256 |
| 2,314,001 | A | * | 3/1943 | Lusher | ............... F16L 33/2076 285/148.16 |
| 2,314,002 | A | * | 3/1943 | Lusher | ............... F16L 33/2076 285/256 |
| 2,432,598 | A | * | 12/1947 | Weatherhead, Jr. | .. F16L 33/207 285/256 |

(Continued)

FOREIGN PATENT DOCUMENTS

| DE | 202006015598 | 2/2007 |
|---|---|---|
| DE | 102007026394 | 12/2008 |
| EP | 0267709 | 10/1987 |

*Primary Examiner* — David Bochna
(74) *Attorney, Agent, or Firm* — Volpe and Koenig, P.C.

(57) ABSTRACT

A hose line and to a method for its production are provided. The hose line (1) has a hose connection (3) which has a connection piece having a connection nipple. A hose end of a flexible hose (2) is pushed onto the connection nipple. The hose connection (3) also has a crimp sleeve (6) which immovably clamps the hose end between itself and the connection nipple in the longitudinal direction of the nipple. There are at least two tool contact surfaces on the hose connection (3), arranged on opposite sides of the hose connection (3), preferably allocated to each other in pairs and in particular designed as wrench contact surfaces (7). The at least two tool contact surfaces of the hose connection (3), which are allocated to each other in pairs, are on the crimp sleeve (6).

14 Claims, 5 Drawing Sheets

(56) References Cited

U.S. PATENT DOCUMENTS

Figure 12:
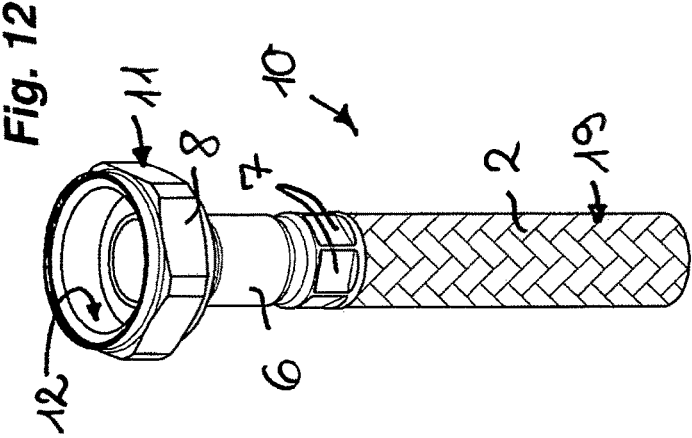

| | | | | |
|---|---|---|---|---|
| 2,489,890 A | * | 11/1949 | Hufferd | F16L 33/207 |
| | | | | 285/256 |
| 2,499,241 A | * | 2/1950 | Courtot | F16L 33/207 |
| | | | | 285/256 |
| 2,517,669 A | * | 8/1950 | Hufferd | F16L 33/207 |
| | | | | 285/256 |
| 2,570,477 A | | 10/1951 | Paquin | |
| 2,584,948 A | * | 2/1952 | Weatherhead, Jr. | F16L 33/207 |
| | | | | 285/256 |
| 3,570,111 A | * | 3/1971 | Courtot et al. | F16L 33/207 |
| | | | | 29/445 |
| 4,548,430 A | | 10/1985 | Haubert et al. | |
| 4,804,212 A | * | 2/1989 | Vyse | B21D 39/04 |
| | | | | 285/256 |
| 5,105,854 A | * | 4/1992 | Cole | F16L 33/2076 |
| | | | | 285/256 |
| 5,317,799 A | * | 6/1994 | Chapman | F16L 33/2076 |
| | | | | 285/256 |
| 5,364,135 A | * | 11/1994 | Anderson | F16L 33/2076 |
| | | | | 285/256 |
| 5,413,147 A | * | 5/1995 | Moreiras | F16L 33/2076 |
| | | | | 285/258 |
| 8,727,386 B2 | | 5/2014 | Koch | |
| 2005/0081381 A1 | * | 4/2005 | Ingram | F16L 33/207 |
| | | | | 285/256 |
| 2015/0226356 A1 | * | 8/2015 | Kury | F16L 33/207 |
| | | | | 285/256 |

\* cited by examiner

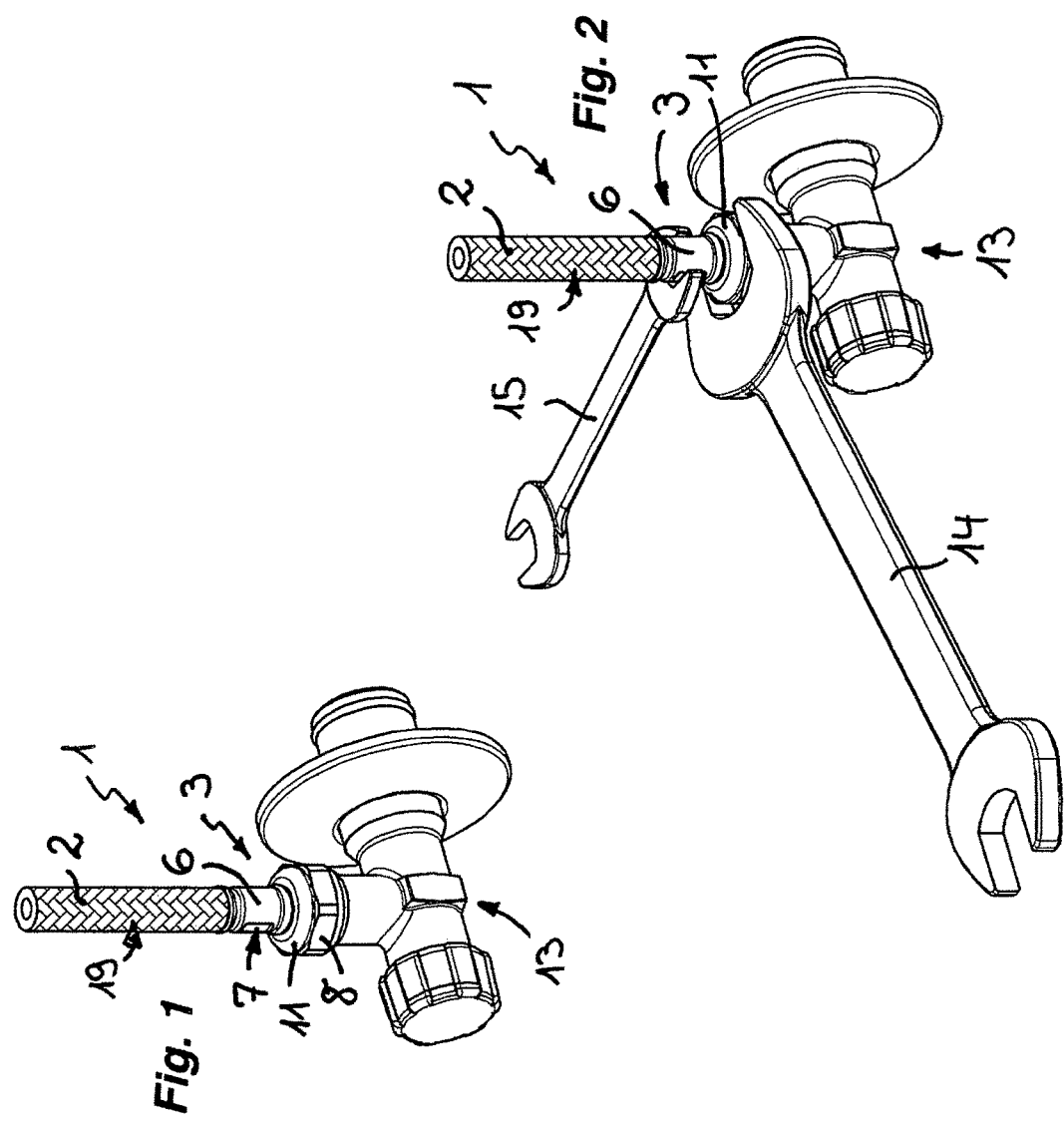

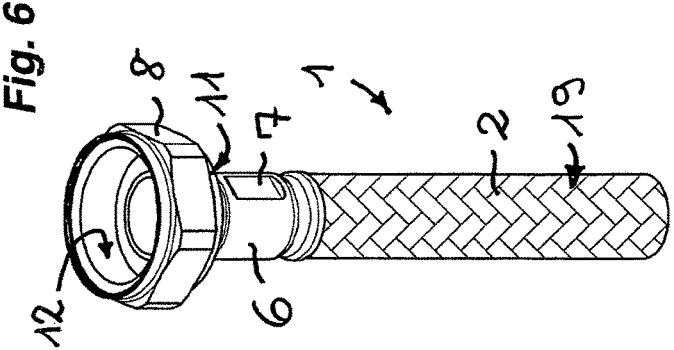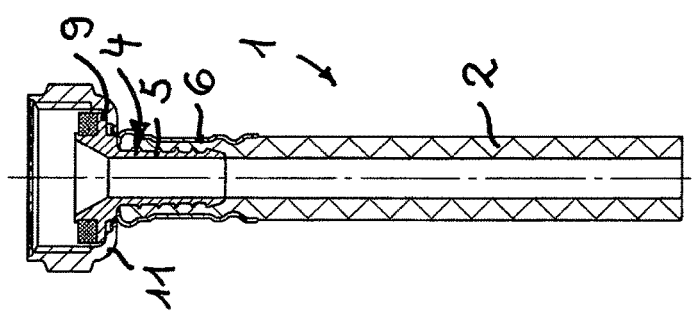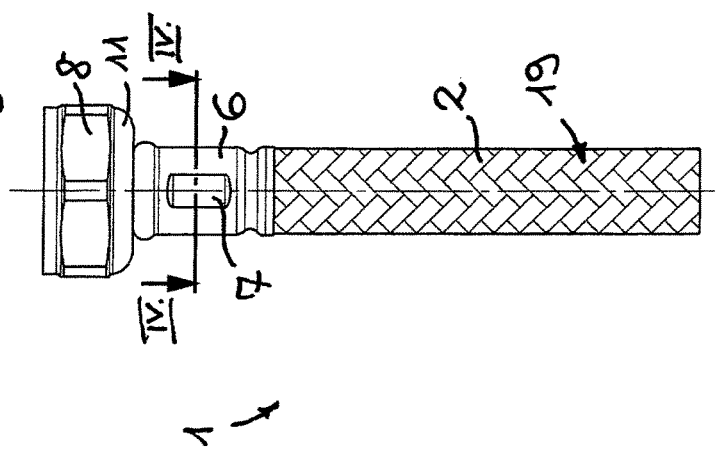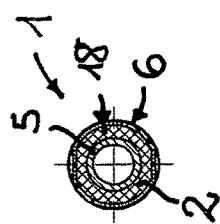

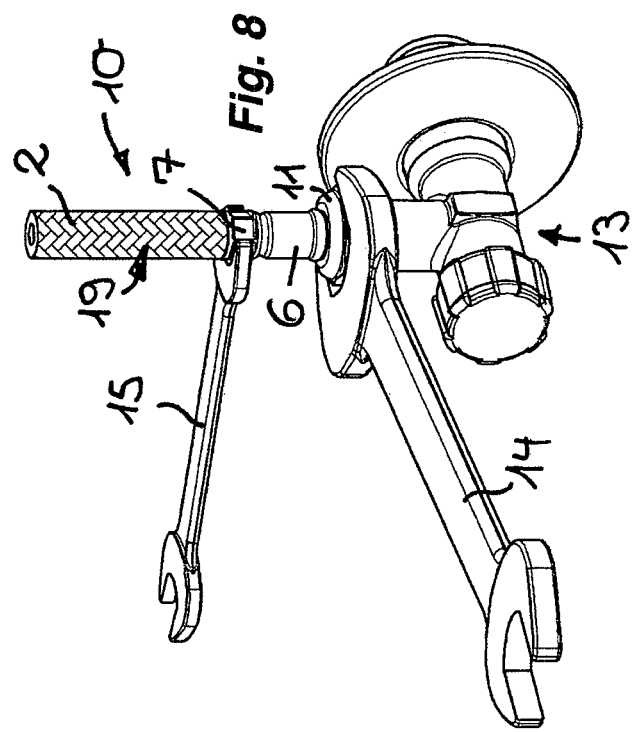
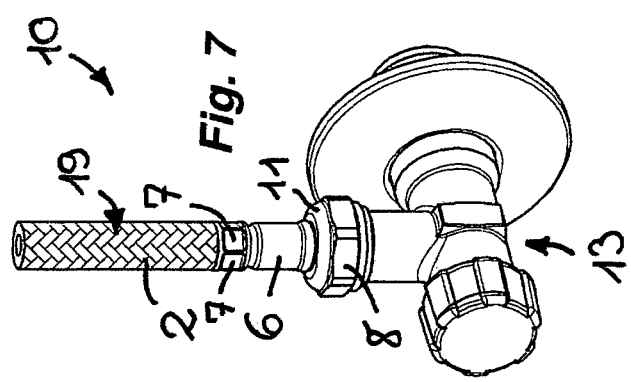

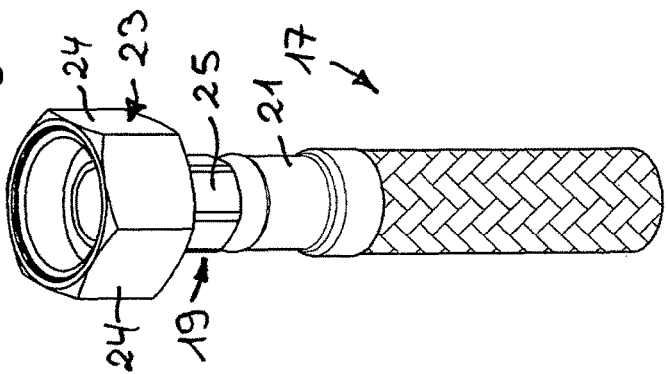
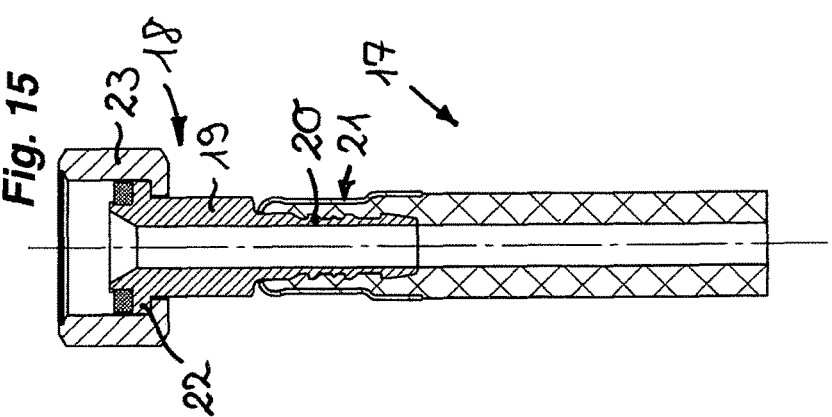
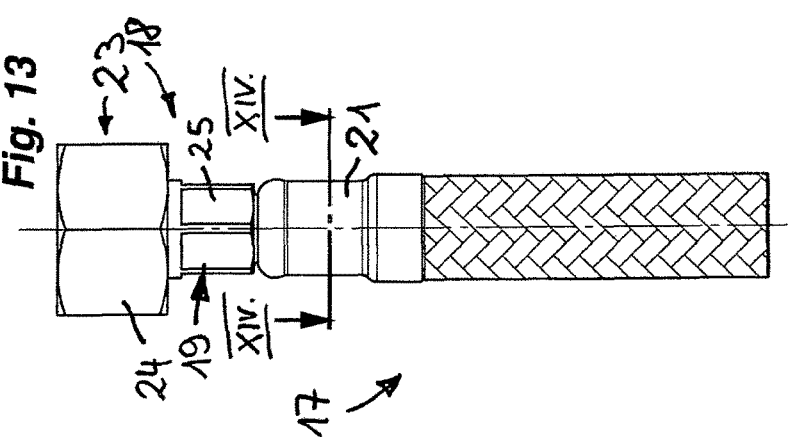
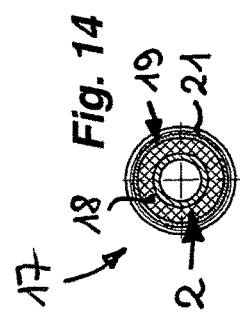

HOSE LINE AND METHOD FOR PRODUCING A HOSE LINE

BACKGROUND

The invention relates to a hose line having at least one hose connector which has a connection piece with a connection nipple, onto which connection nipple a hose end of a flexible hose is pushed, and which has a crimp sleeve which clamps the hose end between itself and the connection nipple in an immovable manner in the longitudinal direction of the nipple, wherein the hose connector has at least two tool engagement surfaces that are arranged on the crimp sleeve on opposite sides of the hose connector.

The present invention also deals with a method for producing a hose line having a sleeve-like connection piece, one sleeve end of which is configured as a connection nipple onto which a hose end of a flexible hose is pushed before the hose end pushed onto the nipple is secured by crimping a crimp sleeve.

A hose line of the generic type having at least one hose connector is already previously known from EP 0 267 709 A1, said hose connector having a connection piece with a connection nipple, onto which connection nipple a hose end of a flexible hose is pushed. A crimp sleeve engages around the connection nipple and the hose end pushed onto the latter, said crimp sleeve being crimpable from a non-deformed state into a deformed state with a smaller clear sleeve cross section. In this case, the crimp sleeve clamps the hose end between itself and the connection nipple in an immovable manner in the longitudinal direction of the nipple. Above that subregion of the crimp sleeve that clasps the hose end, two tool engagement surfaces are integrally formed thereon, said tool engagement surfaces being provided on opposite sides of the crimp sleeve. While small protuberances arise between the pressing jaws of the crimping tool during the crimping of the crimp sleeve, said protuberances being formed by material displacement during crimping and being completely unsuitable as tool engagement surfaces for a turning tool, the hexagon having the tool engagement surfaces is already formed into the non-deformed crimp sleeve and is neither intended nor suitable for compression molding during crimping.

A hose line having a hose connector which has a connection piece with a connection nipple is already known from DE 10 2007 026 394 A1. The hose end of a flexible hose line is pushed onto the connection nipple and secured with a crimp sleeve that engages around the connection nipple and the hose end pushed onto the latter. In order to achieve a connection that is able to be subjected to torsional stress between the connection nipple and the hose end pushed onto the latter, the crimp sleeve is pressed together with the connection nipple in a non-round manner such that there is a rotationally fixed form-fitting connection between the crimp sleeve and the connection nipple. Since a connection that is able to be subjected to torsional stress between the connection nipple and the hose end pushed onto the latter is desired, additional tool engagement surfaces are not provided on the crimp sleeve.

A hose line having a hose connector is previously described in U.S. Pat. No. 4,548,430 A, said hose connector having a connection piece with a connection nipple, onto which connection nipple a hose end of a flexible hose is likewise pushed. The hose connector has a crimp sleeve which clamps the hose end between itself and the connection nipple in an immovable manner in the longitudinal direction of the nipple. The hose connector has a tool engagement surface which is provided above the connection nipple on the hose connector at a distance from the crimp sleeve and the hose end enclosed thereby. Insofar as the crimp sleeve obtains a cross-sectionally octagonal flat contour in subregions during crimping, these octagonal subregions are neither intended nor suitable as tool engagement surfaces.

A hose line having a connection piece is known from U.S. Pat. No. 2,570,477 A, in which the hose end pushed onto the connection piece is secured by means of a crimp sleeve which is prefabricated as a stamped part. The crimp sleeve has an inwardly bent peripheral region at its sleeve end remote from the hose, said peripheral region having a hexagonal external contour that serves as a tool engagement surface. In this case, the internal and inwardly indented peripheral zone serves at the same time as an abutment surface against which the hose end bears. The production of this crimp sleeve prefabricated with the hexagonal end peripheral region entails a great deal of effort.

A hose line having a hose coupling is known from U.S. Pat. No. 1,954,989 A, said hose coupling being intended to connect a hexagonally prefabricated pipe. This hose line, with its hexagonally prefabricated pipe, is producible only with a great deal of effort and is limited to specific applications.

A hose line having at least one hose connector which has a connection piece with a connection nipple, is already known from DE 20 2006 015 598 U1. The hose end of a flexible hose is pushed onto the connection nipple. The previously known hose connector has a crimp sleeve which clamps the hose end between itself and the connection nipple in an immovable manner in the longitudinal direction of the nipple, wherein the hose connector has at least two tool engagement surfaces that are arranged on opposite sides of the hose connector. Provided in that subregion of the connection piece that protrudes beyond the connection nipple is a groove in which the crimp sleeve engages with an inwardly thickened wall portion. Wrench flats for the engagement of a tool are provided on the outer circumference of the connection piece, wherein the crimp sleeve has in its thickened wall portion a polygon which corresponds to the shape of the wrench flats provided on the connection piece and the shape of which is matched to these wrench flats. Since the crimp sleeve of the previously known hose connector thus has to mold itself to the shape of the polygon provided on the connection piece, the production of the previously known hose connector and the connection piece thereof with the polygon provided thereon is comparatively complicated.

Such hose lines are used for example to connect the outlet fitting provided on a wash basin to the angle valve of a water supply line. Since such wash basins are frequently also fitted into a kitchen unit and the outlet valve usually has to be mounted in the immediate vicinity of the wash basin there, the mounting of the outlet valve and the associated hose lines can be very complicated and time-consuming under the confined spatial conditions that prevail under the sink.

Also already known is a hose line which has at one hose end a hose connector which has a sleeve-like connection piece, the hose-side end of which is configured as a connection nipple. A hose end of a flexible hose is pushed onto the connection nipple, which is contoured on its outer circumference. The hose connector also has a crimp sleeve, which clamps the mentioned hose end between itself and the connection nipple in an immovable manner in the longitudinal direction of the nipple and secures it on the hose nipple. The connection piece is configured as a screw connection and has an annular shoulder behind which a union nut engages. This union nut has an internal thread which is able to be screwed onto an external thread provided on the angle valve. In this case, the outer circumference of the union nut is configured as a hexagon, the six edge surfaces of which serve as wrench engagement surfaces that are assigned to one another in pairs. In order to be able to screw the union nut with its internal thread firmly and tightly onto the external thread on the angle valve without the connection piece being able to co-rotate in the process, at least two wrench engagement surfaces to which a backup wrench can be attached, said wrench engagement surfaces being arranged on opposite sides and being assigned to one another in pairs, are also provided in that subregion of the connection piece that is arranged between the crimp sleeve for the one part and the union nut for the other part.

In order to be able to attach the backup wrench there, this subregion of the connection piece has to be configured in a relatively long manner. However, it is disadvantageous that a comparatively long subregion at the same time also requires a comparatively long installation length, which is not always available under confined spatial conditions. Furthermore, a comparatively large installation length can result in a correspondingly large minimum radius of curvature of the hose line. And finally, the wrench engagement surfaces that are provided for the backup wrench are provided in a subregion of the connection piece that is spaced apart from the hose, said subregion being accessible by an open-end wrench only with difficulty under confined spatial conditions.

SUMMARY

It is therefore the object to create a hose line of the type mentioned at the beginning, which is easy to mount under confined spatial conditions and is usable in a versatile manner. Furthermore, the object is also to create a method of the type mentioned at the beginning, which allows the easy production of a hose line that is easy to mount and is usable in a versatile manner.

In the case of the hose line mentioned at the beginning, the object is achieved according to the invention in that the at least two tool engagement surfaces are arranged in a portion of the crimp sleeve in which the crimp sleeve fully encases the hose end, and in that the at least two tool engagement surfaces are configured only as deformations or indentations of the crimp sleeve that are formed during the crimping of the crimp sleeve on the connection piece, without molding of the connection nipple.

The hose line according to the invention has a flexible hose which has a hose connector at at least one of its two hose ends. This hose connector has a connection piece with a connection nipple, onto which connection nipple the associated hose end of the flexible hose is pushed. The hose connector is assigned a crimp sleeve which, at least in a subregion of its longitudinal extent, is crimp able from a non-deformed state into a deformed state with a smaller clear sleeve cross section. In the crimped use position, the crimp sleeve clamps the hose end between itself and the connection nipple in an immovable manner in the longitudinal direction of the nipple. Provided on the hose connector are at least two tool engagement surfaces that are arranged on opposite sides of the hose connector, said tool engagement surfaces being arranged according to the invention on the crimp sleeve. The tool engagement surfaces arranged on opposite sides of the hose connector do not necessarily have to be arranged in an axially parallel manner to one another, but rather these tool engagement surfaces arranged on opposite sides of the hose connector can also be integrally formed on the crimp sleeve at an angle to one another. Since these tool engagement surfaces are provided on the crimp sleeve, that subregion of the connection piece that is enclosed by the crimp sleeve can immediately adjoin the hose connection located on the connection piece, without a subregion of the connection piece that is kept free of the crimp sleeve being necessary in between. According to the invention, provision is made for the at least two tool engagement surfaces to be configured only as deformations or indentations of the crimp sleeve that are formed during the crimping of the crimp sleeve on the connection piece, without molding of the connection nipple. Since the at least two tool engagement surfaces are arranged in a portion of the crimp sleeve in which the crimp sleeve fully encases the hose end, the elastic material of the hose end bearing against the inner side of the crimp sleeve can withstand and absorb the cross-sectional changes formed by the deformations or indentations of the crimp sleeve during crimping, without the crimp sleeve having to mold itself on the connection nipple of the connection piece. The deformations or indentations of the crimp sleeve that are formed as tool engagement surfaces additionally secure the hose end bearing against the inner side of the crimp sleeve to the connection nipple located in the hose interior. The hose connector can therefore be configured in a comparatively short and space-saving manner. Furthermore, the spacing between the hose connection, provided on the connection piece, of the hose line for the one part and the hose for the other part can be kept comparatively small, and this can simplify mounting. Since the hose connector can be dimensioned in a relatively short manner, the minimum bending radius of the hose line can be kept comparatively small, thereby favoring versatile usability of the hose line according to the invention. Since the connection piece can be configured in a comparatively small manner, this results in a not inconsiderable saving of material; since such connection pieces are frequently produced from brass, a not inconsiderable cost saving is also achievable with this saving of material. In addition, with the comparatively short connection piece, the production effort is also considerably reduced. Specifically, in the internal machining of such connection pieces, tool cooling and chip removal are problematic in particular in the case of long workpieces; as a result of the connection piece being shortened, the production effort for the internal machining thereof can be considerably reduced.

In a preferred development according to the invention, the at least two tool engagement surfaces are assigned to one another in pairs.

Here, preference is given to an embodiment according to the invention in which the at least two tool engagement surfaces are configured as wrench engagement surfaces. In particular an open-end wrench, but also any other suitable tool, for example pincers or a pipe wrench, can be attached to such wrench engagement surfaces.

In order also to be able to attach a conventional open-end wrench or some other suitable tool quickly and securely to the crimp sleeve, it is advantageous for the at least two wrench engagement surfaces to extend along more than half the longitudinal extent and preferably along the entire longitudinal extent of the crimp sleeve. In particular when the at least two tool engagement surfaces extend virtually along the entire longitudinal extent of the crimp sleeve, the open-end wrench determined as a backup tool can be attached readily to the tool engagement surfaces without the latter having to be sought in a time-consuming manner under confined spatial conditions.

In order to incorporate the tool engagement surfaces into the crimp sleeve, preference is given to a production method in which the tool engagement surfaces are indented into the crimp sleeve by correspondingly deforming the latter. Since the crimping of the crimp sleeve in any case requires deformation of this crimp sleeve, in a preferred embodiment according to the invention, the at least two wrench engagement surfaces are arranged in a deformed or crimped subregion of the crimp sleeve. In this embodiment, the crimping of the crimp sleeve is simultaneously also used to indent the required tool engagement surfaces into the crimp sleeve.

In order to secure the flexible hose firmly and securely to the hose nipple of the connection piece, it may be necessary for the cross-sectionally round crimp sleeve to engage around the hose end with a virtually constant internal cross section. In order that the crimped crimp sleeve can engage around the hose end with an at least virtually constant cross section, it may be advantageous for the at least two tool engagement surfaces to be arranged in a non-deformed subregion of the crimp sleeve.

In a preferred embodiment according to the invention, that subregion of the crimp sleeve that has the at least two tool engagement surfaces forms the hose-side sleeve end of said crimp sleeve. This embodiment affords the advantage that the backup tool can be attached easily to the crimp sleeve even under confined spatial conditions.

In order to be able to attach an open-end wrench easily and conveniently to the crimp sleeve without having to tediously look for the wrench engagement surfaces on the circumference of this crimp sleeve that are required for this purpose, it may be advantageous for at least two and preferably three pairs of wrench engagement surfaces that are assigned to one another and are arranged in a common cross-sectional plane of the crimp sleeve to be provided. In particular an embodiment in which three pairs of wrench engagement surfaces that are assigned to one another are provided has a nut-like external contour to which the open-end wrench can be repeatedly attached readily in different angular positions even under confined spatial conditions.

In this case, it is particularly advantageous for adjacent wrench engagement surfaces to enclose an angle of 60° or 90°.

In order to be able to tighten the hose connection provided between the hose connector for the one part and an angle valve or similar adjacent line portion for the other part, it is advantageous for the connection piece also to have at least two tool engagement surfaces that are preferably assigned to one another in pairs and are configured in particular as wrench engagement surfaces in a subregion that is kept free of the crimp sleeve.

The connection piece can have a connection eyelet into which a throughflow opening of the hose line leads. However, in a preferred development of the invention, an annular shoulder is provided on the connection piece, a union nut engaging behind said annular shoulder, and the union nut has at least two tool engagement surfaces that are preferably assigned to one another in pairs and are configured in particular as wrench engagement surfaces on its outer circumference.

In order that the hose line according to the invention can be exposed even to relatively high burst pressures and in order that the elastic material of the flexible hose is protected well from external influences, it is advantageous for the hose line to be configured in a multilayer manner, and for provision to be made of at least an inner hose which encases a mesh and in particular a metal mesh.

In the method of the type mentioned at the beginning, the solution according to the invention consists in that the crimp sleeve is deformed during crimping in a portion of the crimp sleeve that fully encases the hose end, without molding of the connection nipple, such that at least two tool engagement surfaces are formed.

Since the crimping of the crimp sleeve in any case requires deformation of this crimp sleeve, a preferred procedure can consist in that the tool engagement surfaces are indented at least regionally into a crimped subregion of the crimp sleeve during crimping.

In this case, in a preferred procedure, the at least two tool engagement surfaces are configured or formed as wrench engagement surfaces that are assigned to one another in pairs.

BRIEF DESCRIPTION OF THE PREFERRED EMBODIMENTS

Developments according to the invention can be gathered from the claims in conjunction with the drawings and the description. The invention is described in even more detail in the following text by way of preferred exemplary embodiments.

Figure 11:
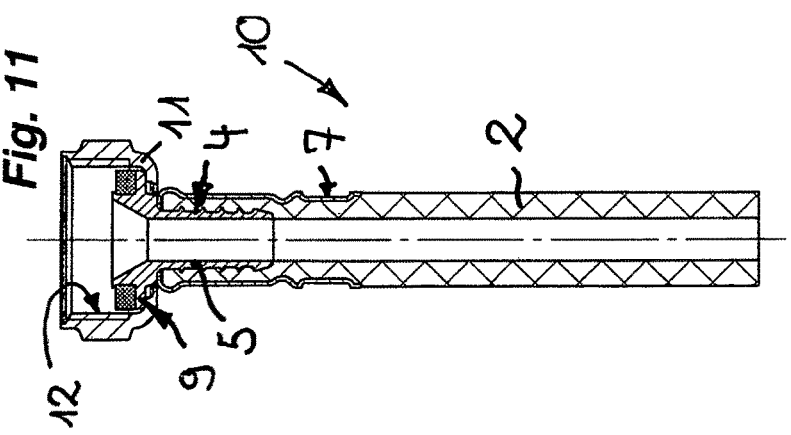
Figure 9:
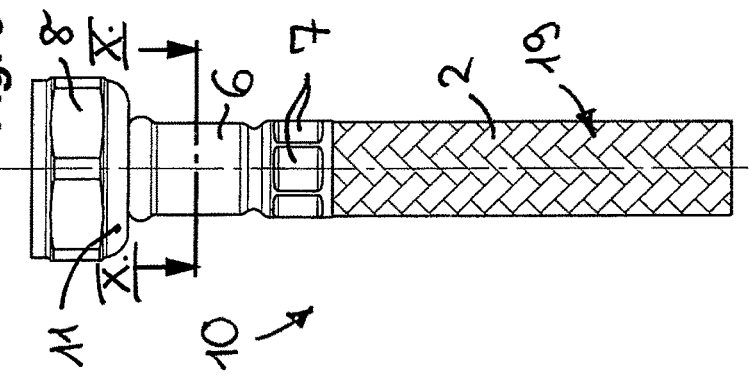
Figure 10:
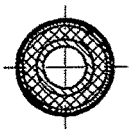

In the drawings:

FIG. 1 shows a hose line, in a perspective use position, in the region of a hose connector, which hose connector is connected to an angle valve of a water line, FIG. 2 shows the hose connector of the hose line shown in FIG. 1, wherein an open-end wrench is acting on a union nut, connected to the angle valve, of the hose connector, said open-end wrench being intended to turn the screw connection, and wherein a further open-end wrench is attached as a backup wrench to a crimp sleeve, said backup wrench firmly holding and securing a hose end of a flexible hose of the hose line at the hose connector, FIG. 3 shows the hose line from FIGS. 1 and 2 in a side view in the region of its hose connector, FIG. 4 shows the hose line from FIGS. 1 to 3 in a cross section through the section plane Iv-Iv in FIG. 3, FIG. 5 shows the hose line from FIGS. 1 to 4 in a longitudinal section, FIG. 6 shows the hose line from FIGS. 1 to 5 in a perspective illustration, FIG. 7 shows a perspective illustration of a hose line mounted on the angle valve of a water line, said hose line differing from the hose line shown in FIGS. 1 to 6 essentially only by the arrangement of the wrench engagement surfaces, provided for the open-end wrench intended as a backup wrench, on the crimp sleeve, FIG. 8 shows the hose line from FIG. 7 connected to the angle valve, wherein here too—as in FIG. 2—an open-end wrench is respectively attached to the union nut for the one part and to the crimp sleeve for the other part, FIG. 9 shows the hose line from FIGS. 7 and 8 in a side view, FIG. 10 shows the hose line from FIGS. 7 to 9 in a cross section through the section plane X-X in FIG. 9, FIG. 11 shows the hose line from FIGS. 7 to 10 in a longitudinal section, FIG. 12 shows the hose line from FIGS. 7 to 11 in a perspective plan view onto the hose connector, FIG. 13 shows a hose line corresponding to the prior art in a side view in the region of its hose connector, FIG. 14 shows the hose line from FIG. 13 in cross section XIV-XIV in FIG. 13, FIG. 15 shows the hose line from FIGS. 13 and 14 in a longitudinal section, and FIG. 16 shows the hose line from FIGS. 13 to 15 in a perspective plan view onto the hose connector.

FIGS. 13 to 16 illustrate a previously known hose line 17 that counts as prior art. This hose line 17 has a hose connector 18 at least at its one line end, said hose connector 18 having a connection piece 19 with a connection nipple 20. A hose end of a flexible hose 16 has been pushed onto the hose nipple 20, which is contoured and can have for example a plurality of circumferential protrusions and recesses that are spaced apart from one another in the longitudinal extent of the nipple. The hose connector 18 has a crimp sleeve 21 which is pushed onto the hose end, held on the connection nipple 20, of the hose 16 and is subsequently crimped there such that the crimp sleeve 6 clamps the hose end between itself and the connection nipple 20 in an immovable manner in the longitudinal direction of the nipple. Provided on the connection piece 19 is an annular shoulder 22 behind which a union nut 23 engages. This union nut 23 has a nut-like external contour with three pairs of wrench engagement surfaces 24 that are assigned to one another in pairs and are arranged on opposite sides. In order to be able to screw the union nut 23 with its internal thread firmly and tightly onto the external thread of an adjoining line portion without the connection piece 19 being able to co-rotate in the process, wrench engagement surfaces 25 that are assigned to one another in pairs can also be provided in that subregion of the connection piece 19 that is provided between the crimp sleeve 21 and union nut 23, it being possible to attach an open-end wrench that serves as a backup wrench to said wrench engagement surfaces 25. In order to be able to attach the open-end wrench that serves as a backup wrench there, this subregion, having the wrench engagement surfaces 25, of the connection piece 19 has to be configured in a comparatively long manner. However, it is disadvantageous that a comparatively long subregion at the same time also requires a comparatively long installation length, which is not always available under confined spatial conditions. Furthermore, a comparatively large installation length can result in a correspondingly large minimum radius of curvature of the hose line 17. And finally, the wrench engagement surfaces 25 are provided in a subregion of the connection piece 17 that is spaced apart from the hose 16, where the wrench engagement surfaces 25 are frequently scarcely readily accessible anymore under confined spatial conditions.

DETAILED DESCRIPTION OF THE PREFERRED EMBODIMENTS

FIGS. 1 to 12 illustrate two different embodiments 1, 10 of a hose line according to the invention. The hose lines 1, 10 have a flexible hose 2 which has a hose connector 3 at at least one of its two hose ends. This hose connector 3 has a connection piece 4 with a connection nipple 5, onto which connection nipple 5 the associated hose end of the flexible hose 2 is pushed. The hose connector 3 is assigned a crimp sleeve 6 which, at least in a subregion of its longitudinal extent, is crimpable from a non-deformed state into a deformed state with a smaller clear sleeve cross section. In the crimped use position, the crimp sleeve 6 clamps the hose end of the hose 2 between itself and the connection nipple 5 in an immovable manner in the longitudinal direction of the nipple. Provided on the hose connector 3 are at least two tool engagement surfaces arranged on opposite sides of the hose connector 3, said tool engagement surfaces being arranged according to the invention on the crimp sleeve 6. The at least two tool engagement surfaces are arranged in a portion of the crimp sleeve 6 in which the crimp sleeve 6 fully encases the hose end of the hose 2. In this case, the at least two tool engagement surfaces are configured only as deformations or indentations of the crimp sleeve 6 that are formed during the crimping of the crimp sleeve 6 on the connection piece 4, without molding of the connection nipple. These tool engagement surfaces are assigned to one another in pairs and preferably configured as wrench engagement surfaces 7. An open-end wrench or ring wrench, but also any other suitable tool, for example a pipe wrench, can be attached to these wrench engagement surfaces 7. Since these wrench engagement surfaces 7 are provided on the crimp sleeve 6, that subregion of the connection piece 4 that is enclosed by the crimp sleeve 6 can immediately adjoin the hose connection located on the connection piece, without a subregion of the connection piece 4 that is kept free of the crimp sleeve 6 being necessary in between. The hose connector 3 can therefore be configured in a comparatively short and space-saving manner. Furthermore, the spacing between the hose connection, provided on the connection piece 4, of the hose line 1, 10 for the one part and the hose 2 for the other part can be kept comparatively small, and this can simplify mounting. Since the hose connector 3 can be dimensioned in a relatively short manner, the minimum bending radius of the hose line 1, 10 can be kept comparatively small, thereby favoring versatile usability of this hose line 1, 10.

An embodiment that is not illustrated here can consist in that the at least two wrench engagement surfaces 7 extend along more than half the longitudinal extent and preferably along the entire longitudinal extent of the crimp sleeve 6. In an embodiment that is likewise not illustrated, the at least two wrench engagement surfaces can be arranged in a non-crimped subregion of the crimp sleeve 6.

In the embodiments 1, 10 of the hose line that are illustrated in FIGS. 1 to 12, the at least two wrench engagement surfaces 7 are arranged by contrast in a crimped subregion of the crimp sleeve 6. In this case, the wrench engagement surfaces 7 are indented into the crimp sleeve 6 during the crimping of the latter. While, in the case of the hose line 10 according to FIGS. 7 to 12, the wrench engagement surfaces 7 are provided in a subregion of the crimp sleeve that forms the hose-side sleeve end, the wrench engagement surfaces 7 in the case of the hose line 1 are positioned approximately centrally in the longitudinal extent of the crimp sleeve 6. While only two wrench engagement surfaces 7 that are assigned to one another in pairs are provided on the crimp sleeve 6 of the hose line 1, the crimp sleeve 6 of the hose line 10 has three pairs of wrench engagement surfaces 7 assigned to one another, said wrench engagement surfaces 7 being arranged in a common cross-sectional plane of the crimp sleeve and adjoining wrench engagement surfaces 7 thereof each enclosing an angle of 60°.

The hose lines 1, 10 also have two wrench engagement surfaces 8 that are assigned to one another in pairs in a subregion of their hose connector that is kept free of the crimp sleeve 6. Since at least the hose connector 3, shown here, of the hose lines 1, 10 is configured as a screw connection, an annular shoulder 9 is provided on the connection piece 4 thereof, a union nut 11 engaging behind said annular shoulder 9. This union nut 11 bears the at least two tool engagement surfaces 8 that are assigned to one another in pairs on its outer circumference. The union nut 11 has on its inner circumference an internal thread 12 which can be screwed onto an external thread of an adjoining line portion, for example of a wall-side angle valve 13. In order to screw up or loosen the screw connection, an open-end wrench 14 can be attached to the wrench engagement surfaces 8 of the union nut 11. In order in this case that the connection piece 4 cannot co-rotate and in order that in the process an undesired twist cannot act on the hose in the direction of rotation of the hose 2, an open-end wrench 15 that serves as a backup tool is attachable to the wrench engagement surfaces 7 of the crimp sleeve 6. The hoses 2, 16 of the hose lines 1, 10, 17 illustrated here are configured in a multilayer manner and have an internal hose 18 made of elastically bendable material which encases a protective metal mesh 19.

LIST OF REFERENCE SIGNS

1 Hose line (according to FIGS. 1 to 6)
2 Hose
3 Hose connector
4 Connection piece
5 Connection nipple
6 Crimp sleeve
7 Wrench engagement surfaces
8 Wrench engagement surfaces
9 Annular shoulder
10 Hose line (according to FIGS. 7 to 12)
11 Union nut
12 Internal thread
13 Angle valve
14 Open-end wrench
15 Open-end wrench
16 Hose
17 Hose line (according to FIGS. 13 to 16)
18 Internal hose
19 Metal mesh
20 Connection nipple
21 Crimp sleeve
22 Annular shoulder
23 Union nut
24 Wrench engagement surface
25 Wrench engagement surface

The invention claimed is:

1. A hose line (1, 10) comprising at least one hose connector (3) which has a connection piece (4) with a connection nipple (5), onto which connection nipple (5) a hose end of a flexible hose (2) is pushed, and a crimp sleeve (6) which clamps the hose end between itself and the connection nipple (5) in an immovable manner in a longitudinal direction of the nipple, exactly two tool engagement surfaces (7) arranged on the crimp sleeve (6) on opposite sides of the hose connector (3), the at least two tool engagement surfaces (7) are arranged in a portion of the crimp sleeve (6) in which the crimp sleeve (6) fully encases the hose end, and the two tool engagement surfaces (7) are configured only as deformations or indentations of the crimp sleeve (6) formed during crimping of the crimp sleeve (6) on the connection piece (4), without molding of the connection nipple (5), the two tool engagement surfaces are defined by flats that engage and press the flexible hose (2) onto the connection nipple (5), the flats are joined by two curved sleeve portions of the crimp sleeve in a circumferential direction that extend into annular ring-shaped portions of the crimp sleeve that are arranged further from an axis of the connection piece than the flats and are located at axially opposite ends of the flats.

2. The hose line as claimed in claim 1, wherein the two curved sleeve portions extend about a majority of a circumference of the crimp sleeve (6).

3. The hose line as claimed in claim 1, wherein two tool engagement surfaces are configured as wrench engagement surfaces (7).

4. The hose line as claimed in claim 1, wherein the two tool engagement surfaces (7) extend along more than half of a longitudinal extent of the crimp sleeve (6).

5. The hose line as claimed in claim 1, wherein two tool engagement surfaces (7) are arranged in a deformed or crimped subregion of the crimp sleeve (6).

6. The hose line as claimed in claim 1, wherein a subregion of the crimp sleeve (6) that has the two tool engagement surfaces (7) forms a hose-side sleeve end of said crimp sleeve (6).

7. The hose line as claimed in claim 1, wherein the hose is a multilayer hose, and includes at least an inner hose (18) which is encased by a mesh.

8. The hose line as claimed in claim 1, wherein the crimp sleeve includes an annular recess located axially beyond an end of the connection nipple (5).

9. The hose line as claimed in claim 1, further comprising a nut rotatably supported on the connection nipple (5) opposite the hose end.

10. A hose line (1, 10) comprising at least one hose connector (3) which has a connection piece (4) with a connection nipple (5), onto which connection nipple (5) a hose end of a flexible hose (2) is pushed, and a crimp sleeve (6) which clamps the hose end between itself and the connection nipple (5) in an immovable manner in a longitudinal direction of the nipple, at least two tool engagement surfaces (7) arranged on the crimp sleeve (6) on opposite sides of the hose connector (3), the two tool engagement surfaces (7) are arranged in a portion of the crimp sleeve (6) in which the crimp sleeve (6) fully encases the hose end, and the two tool engagement surfaces (7) are configured only as deformations or indentations of the crimp sleeve (6) formed during crimping of the crimp sleeve (6) on the connection piece (4), without molding of the connection nipple (5), the two tool engagement surfaces are defined by flats that engage and press the flexible hose (2) onto the connection nipple (5), annular ring-shaped portions of the crimp sleeve that are arranged further from an axis of the connection piece than the flats are located at axially opposite ends of the flats, and the hose connector (3) has at least two tool engagement surfaces (8) that are assigned to one another in pairs and are configured as wrench engagement surfaces in a subregion that is located axially beyond a region of the connection nipple (5).

11. The hose line as claimed in claim 10, wherein an annular shoulder (9) is provided on the connection piece (4), a union nut (11) engages behind said annular shoulder (9), and the union nut (11) has the two tool engagement surfaces (8) that are assigned to one another in pairs on an outer circumference thereof.

12. A method for producing a hose line, comprising having providing a sleeve-shaped connection piece (4), one sleeve end of which is configured as a connection nipple (5), pushing a hose end of a flexible hose (2) onto the connection nipple (4), securing the hose end onto the connection nipple (4) by crimping a crimp sleeve (6) by deforming the crimp sleeve (6) during crimping, without molding of the connection nipple (5), and forming exactly two tool engagement surfaces (7) on opposite sides, the two tool engagement surfaces are defined by flats and are joined by two curved sleeve portions of the crimp sleeve in a circumferential direction that extend into annular ring-shaped portions of the crimp sleeve that are arranged further from an axis of the connection piece than the flats and are located at axially opposite ends of the flats.

13. The method as claimed in claim 12, wherein during crimping, the tool engagement surfaces (7) are indented at least regionally into a crimped subregion of the crimp sleeve (6).

14. The method as claimed in claim 12, wherein the tool engagement surfaces (7) are configured or embodied as wrench engagement surfaces that are assigned to one another in pairs.

\* \* \* \* \*